(12) United States Patent
Bhat et al.

(10) Patent No.: US 9,681,116 B2
(45) Date of Patent: Jun. 13, 2017

(54) SYSTEM AND METHOD FOR DELIVERING 3DTV CONTENT TO VARIETY OF RECEIVERS

(71) Applicant: General Instrument Corporation, Horsham, PA (US)

(72) Inventors: Dinkar N Bhat, Princeton, NJ (US); Patrick J Leary, Horsham, PA (US); Yeqing Wang, Horsham, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 177 days.

(21) Appl. No.: 13/839,140

(22) Filed: Mar. 15, 2013

(65) Prior Publication Data

US 2014/0282775 A1 Sep. 18, 2014

(51) Int. Cl.
*H04N 21/4402* (2011.01)
*H04N 21/6405* (2011.01)
*H04N 13/00* (2006.01)
*H04N 21/236* (2011.01)
*H04N 21/643* (2011.01)
*H04N 21/81* (2011.01)

(52) U.S. Cl.
CPC ... *H04N 13/0059* (2013.01); *H04N 21/23614* (2013.01); *H04N 21/4402* (2013.01); *H04N 21/6405* (2013.01); *H04N 21/64322* (2013.01); *H04N 21/816* (2013.01); *H04N 21/8193* (2013.01)

(58) Field of Classification Search
CPC ......... H04N 13/0059; H04N 21/23614; H04N 21/4402; H04N 21/6405; H04N 21/64322; H04N 21/816; H04N 21/8193

USPC ......................................................... 725/109
See application file for complete search history.

(56) References Cited

U.S. PATENT DOCUMENTS

| | | | | |
|---|---|---|---|---|
| 8,036,265 | B1 * | 10/2011 | Reynolds | ............... H04L 29/06 375/240.01 |
| 2003/0038838 | A1 * | 2/2003 | Pollitt | ..................... G06F 21/10 715/741 |
| 2008/0168178 | A1 * | 7/2008 | Bouazizi | ............ H04N 21/4305 709/231 |
| 2009/0096864 | A1 * | 4/2009 | Hwang | ................... G06T 17/00 348/42 |

(Continued)

*Primary Examiner* — Nathan Flynn
*Assistant Examiner* — Tung T Trinh
(74) *Attorney, Agent, or Firm* — Thomas A. Ward (57) ABSTRACT

An internet protocol multicast provider is disclosed, which includes a bootstrap code component, a transcoder generator component, a content module and a packetizing module. The bootstrap code component can generate a bootstrap code. The transcoder generator component can generate a transcoder module. The content module can generate content in a first format. The packetizing module can generate internet protocol multicast packets, based on the bootstrap code, the transcoder module and the content. The bootstrap code can determine a second format for which an internet protocol multicast receiver can decode and render the content. The transcoder module can instruct the internet protocol multicast receiver to play the content when the first format is the second format. The transcoder module can instruct the internet protocol multicast receiver to transcode the content from the first format to the second format when the first format is not the second format.

9 Claims, 7 Drawing Sheets

(56) References Cited

U.S. PATENT DOCUMENTS

| | | | | |
|---|---|---|---|---|
| 2009/0125722 A1* | 5/2009 | Gomaa | ............... | G06F 21/10 713/176 |
| 2010/0226366 A1* | 9/2010 | Lee | ............... | H04H 40/18 370/389 |
| 2011/0013884 A1* | 1/2011 | Sasaki | ............... | G11B 27/005 386/248 |
| 2011/0286093 A1* | 11/2011 | Bittner | ............... | G02B 27/22 359/466 |
| 2012/0154375 A1* | 6/2012 | Zhang | ............... | G06F 9/4411 345/419 |
| 2012/0254456 A1* | 10/2012 | Visharam | ............... | H04N 21/2343 709/231 |
| 2013/0067021 A1* | 3/2013 | Broberg | ............... | H04N 21/47202 709/217 |
| 2013/0275557 A1* | 10/2013 | Myers | ............... | H04N 21/2221 709/219 |
| 2013/0315559 A1* | 11/2013 | Hoerentrup | ............... | H04N 13/0456 386/230 |
| 2014/0250479 A1* | 9/2014 | Lee | ............... | H04N 7/08 725/110 |

\* cited by examiner

Prior Art

SYSTEM AND METHOD FOR DELIVERING 3DTV CONTENT TO VARIETY OF RECEIVERS

BACKGROUND

The present disclosure is generally drawn to providing 3-dimensional television (3DTV) content to receivers using an Internet Protocol (IP) multicast approach.

BRIEF SUMMARY OF THE DRAWINGS

The accompanying drawings, which are incorporated in and form a part of the specification, illustrate example embodiments of the present invention and, together with the description, serve to explain the principles of the invention. In the drawings.

DETAILED DESCRIPTION

Widespread deployment of 3D television content in the field faces a complex problem. Not all deployed receivers are capable of displaying 3D content, and the receivers that are capable may have varying support. For example, some receivers are only able to process half resolution—frame compatible formats, while others may be able to process full resolution frame packing formats and full resolution, frame-interleaved formats.

Current methods of deploying 3D television content requires multicasting content in a large variety of formats which becomes increasingly expensive as the number of formats being broadcast rises. Another method of deploying 3D television content requires transcoding hardware that takes up valuable space and increases network hardware complexity.

In order to minimize cost and not require transcoding equipment to be hard wired directly in hardware, content needs to be transmitted in a single format that can be transcoded by a user device, rather than by the network on which it is being transmitted.

Figure 1:
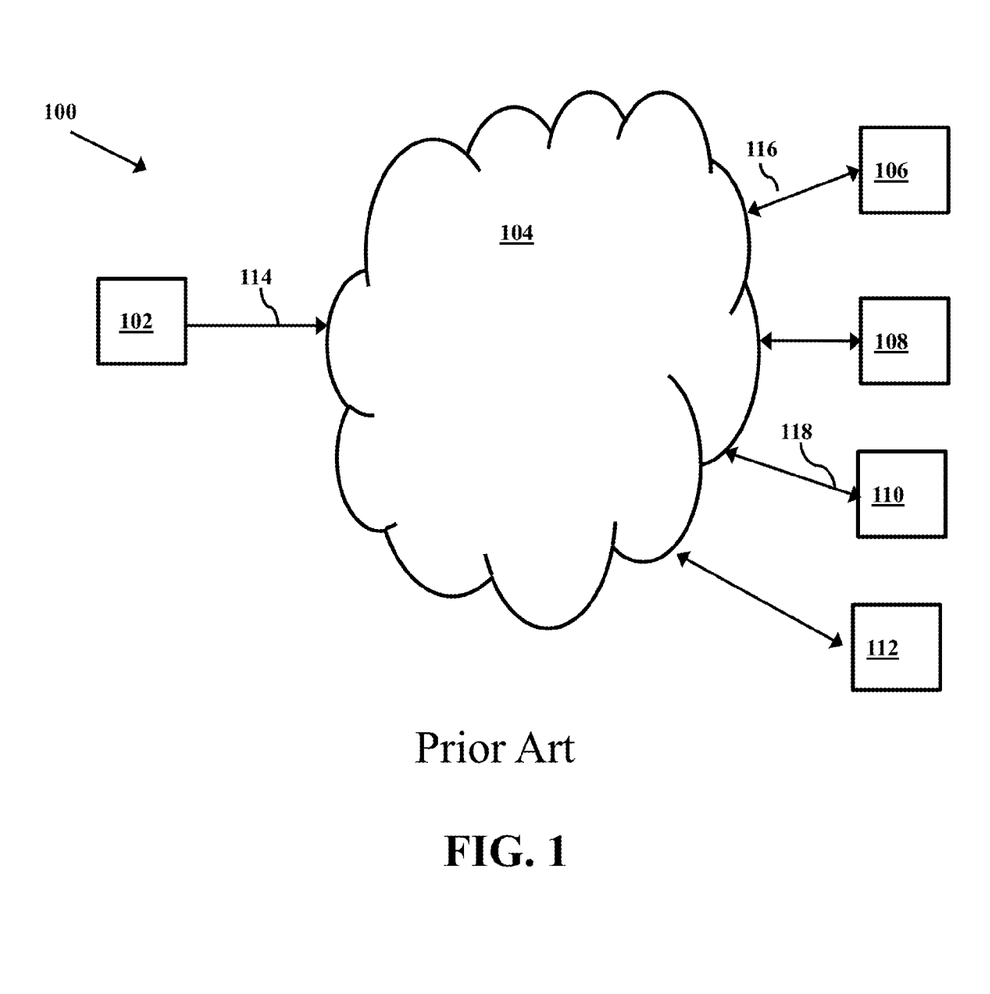
FIG. 1 illustrates an example content delivery system.

FIG. 1 illustrates an example content delivery system 100.

As illustrated in the figure, content delivery system 100 includes a content provider 102, a network 104, a user device 106, a user device 108, a user device 110 and a user device 112.

Content provider 102 is operable to provide content 114 in two different formats, via an IP multicast, to network 104. An IP multicast is the delivery of a message or content to a group of destination computers simultaneously in a single transmission from the source. IP multicast is a one-to-many communication over an IP infrastructure in a network. It scales to a larger receiver population by not requiring prior knowledge of who or how many receivers there are. Multicast uses network infrastructure efficiently by requiring the source to send a packet only once, even if it needs to be delivered to a large number of receivers. The nodes in the network take care of replicating the packet to reach multiple receivers only when necessary.

Network 104 is operable to provide content 114 in a first format to user device 106, user device 108, user device 110 and user device 112. Network 104 is additionally operable to provide content 114 in a second format to user device 106, user device 108, user device 110 and user device 112.

For purposes of discussion: let user device 106 be operable to receive content 114 in a full resolution frame packing 3D format from network 104, via signal 116; let user device 108 be operable to receive content 114 in a half resolution—frame compatible 3D format from network 104, via signal 120; let user device 110 be operable to receive content 114 in an MPEG-2 format, via signal 118; and let user device 112 be operable to receive content 114 in an H.264 format, via signal 122.

In operation, for purposes of discussion presume that content provider 104 provides content 114 in two different formats, via an IP multicast, to network 104. In this example, content 114 is being broadcast in a full resolution frame packing 3D format, and is being broadcast in an MPEG-2 format.

In this example, user device 106 is tuned to the IP multicast session and receives content 114, via signal 116, from network 104. Because user device 106 is capable of receiving full resolution frame packing 3D format, they will receive content 114 from network 104, indicated by signal 116. Simultaneously, user device 110 is tuned to the IP multicast session and receives content 114, via signal 116, from network 104. Because user device 110 is capable of displaying MPEG-2 content, they will receive content 114 from network 104 in the second format, indicated by signal 120.

Now suppose user 108 is tuned to the IP multicast session and receives content 114, via signal 116, from network 104. Since content 114 was only multicast in a full resolution frame packing 3D format and an MPEG-2 by content provider 102, and because user device 108 is only capable of displaying content in a half resolution—frame compatible 3D format, user device 108 is not able to display content 114. Similarly, suppose user 112 is tuned to the IP multicast session and receives content 114, via signal 116, from network 104. Since content 114 was only multicast in a full resolution frame packing 3D format and an MPEG-2 by content provider 102, and because user device 112 is only capable of displaying content in an H.264 format, user device 112 is not able to display content 114.

A problem with content delivery system 100 is that only a user device that supports displaying content in a format that is multicast by content provider 102 may display content. If there is no way to transcode or transmit content in all of the formats that are supported by user devices, only certain user devices may be able to received content from content provider 102.

Figure 2:
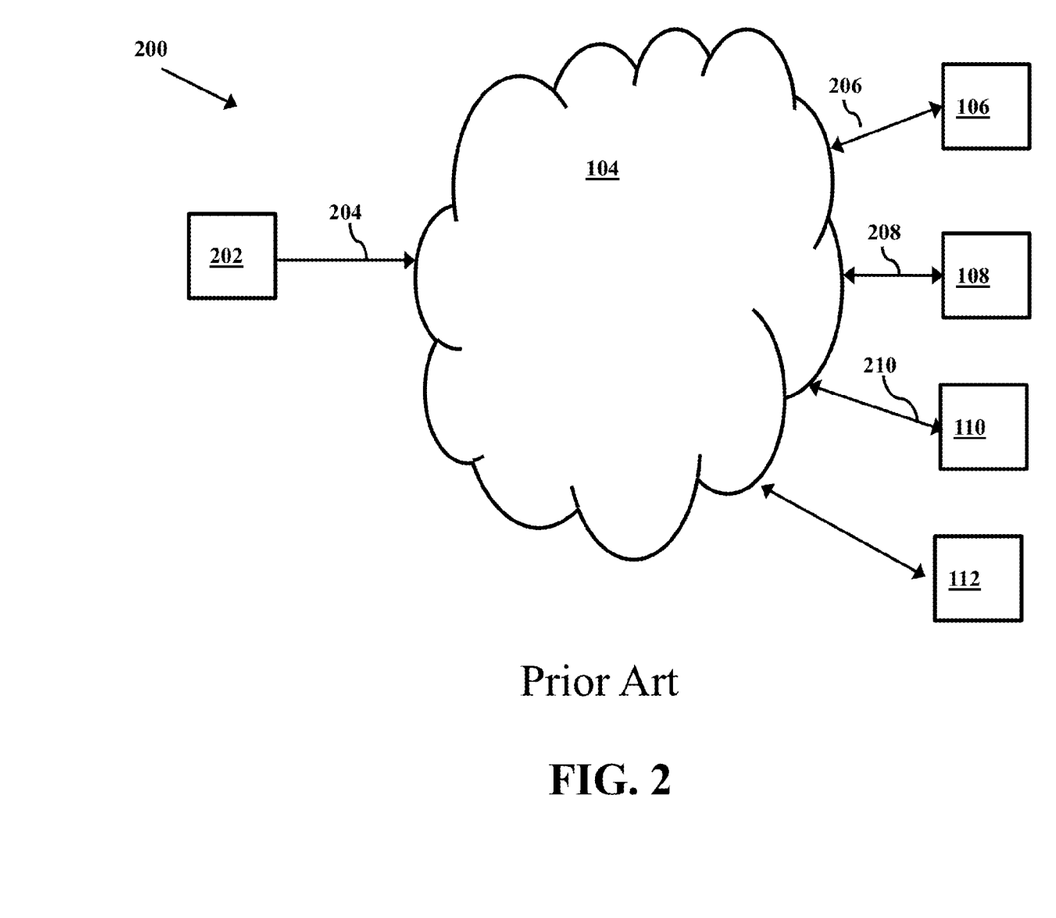
FIG. 2 illustrates another example content delivery system.

FIG. 2 illustrates another example content delivery system 200.

As illustrated in the figure, content delivery system 200 includes some of the same elements of FIG. 1, namely network 104, user device 106, user device 108, user device 110 and user device 112. For purposes of brevity, elements (and their respective functions) that are common between system 100 and system 200 may not be described again.

Content delivery system 200 also includes a content provider 202.

Content provider 202 is operable to provide content 204 in four different formats, via an IP multicast, to network 104.

In this example embodiment, content 202 is broadcast in 3D in a full resolution frame packing 3D format, a half resolution—frame compatible 3D format, an MPEG-2 format, and an H.264 format.

The operation of content delivery system 200 is similar to that of content delivery system 100 described above in FIG. 1. Content provider 202 will provide content 204 to network 104 in four different formats, via an IP multicast.

In this example, user device 106 is tuned to the IP multicast session and receives content 204, via signal 206, from network 104. Because user device 106 is capable of receiving full resolution frame packing 3D format, user device 106 will receive content 204 from network 104, indicated by signal 206. Unlike the example discussed above with reference to FIG. 1, in this example, user device 108 is able to receive content 204. More specifically, suppose user device 108 is tuned to the IP multicast session and receives content 204, via signal 208, from network 104. Since content 204 was additionally multicast in half resolution—frame compatible 3D format, user device 108 will receive content 204 from network 104, indicated by signal 208.

Simultaneously, user device 110 is tuned to the IP multicast session and receives content 204, via signal 210, from network 104. Because user device 110 is capable of displaying MPEG-2 content, they will receive content 204 from network 104 in the MPEG-2 format, indicated by signal 210. Further, unlike the example discussed above with reference to FIG. 1, in this example, user device 112 is able to receive content 204. More specifically, suppose user device 112 is tuned to the IP multicast session and receives content 204, via signal 212, from network 104. Since content 204 was additionally multicast in an H.264 format, user device 112 will receive content 204 from network 104, indicated by signal 212.

A problem with content delivery system 200 is that since each user device supports a different format, content 114 should be multicast in all formats. Multicasting content 114 in all formats consumes a large amount of resources.

Figure 3:
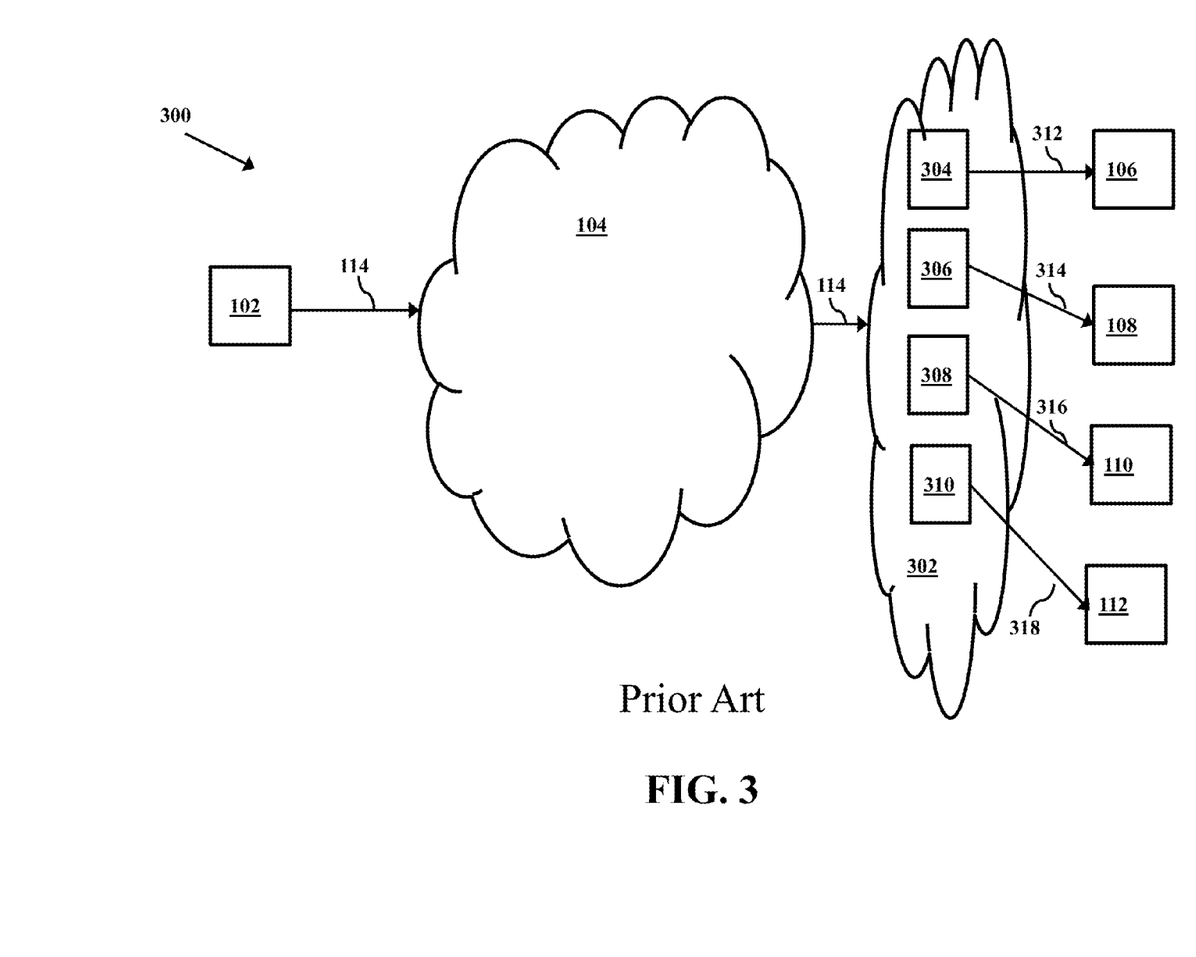
FIG. 3 illustrates another example content delivery system.

FIG. 3 illustrates another example content delivery system 300.

As illustrated in the figure, content delivery system 300 includes some of the same elements of FIG. 1, namely content provider 102 network 104, user device 106, user device 108, user device 110 and user device 112. For purposes of brevity, elements (and their respective functions) that are common between system 100 and system 200 may not be described again.

Content delivery system 300 additionally includes a transcoding component 302. Transcoding component 302 further includes transcoding module 304, transcoding module 306, transcoding module 308, and transcoding module 310.

Transcoding component 302 is operable receive content 114. Transcoding component 302 includes a transcoding unit 304, a transcoding unit 306 and transcoding unit 308 and a transcoding unit 310. Transcoding unit 304 is operable to transcode content 114 from an original format into a full resolution frame packing 3D format indicated by signal 312. Transcoding unit 306 is operable to transcode content 114 from an original format into a half resolution—frame compatible 3D format indicated by signal 314. Transcoding unit 308 is operable to transcode content 114 from an original format into an MPEG-2 format indicated by signal 316. Transcoding unit 310 is operable to transcode content 114 from an original format into an H.264 format indicated by signal 318.

The operation of content delivery system 300 is similar to that of content delivery system 100 described above in FIG. 1, in that content provider 102 will provide content 114 to network 104 in a single format. However, transcoding component then provides transcoded content to each user device.

In this example, user device 106 is tuned to the IP multicast session and receives content 114, via signal 312, from transcoding component 302. Because user device 106 is capable of receiving a full resolution frame packing 3D format, user device 106 will receive content 114, via signal 312, from transcoding component 302. Further, user device 108 is tuned to the IP multicast session and receives content 114, via signal 314, from transcoding component 302. Because user device 108 is capable of receiving a half resolution—frame compatible 3D format, user device 108 will receive content 114, via signal 312, from transcoding component 302. Still further, user device 110 is tuned to the IP multicast session and receives content 114, via signal 316, from transcoding component 302. Because user device 110 is capable of receiving an MPEG-2 format, user device 110 will receive content 114, via signal 316, from transcoding component 302. Finally, user device 112 is tuned to the IP multicast session and receives content 114, via signal 318, from transcoding component 302. Because user device 312 is capable of receiving an H.264 format, user device 112 will receive content 114, via signal 318, from transcoding component 302.

A problem with systems as illustrated in FIG. 1 is that each user device requires content to be in a different format in order to display it. Because content is only multicast in two different formats by the content provider, not all user devices are able to display the content. A problem with systems as illustrated in FIG. 2 is that multicasting content is expensive. Because of the variety of formats that are supported by user devices, it is not feasible to multicast in every format that may be supported by a user device. A problem with systems as illustrated in FIG. 3 is that decoding/transcoding is implemented as hardware. Hardwiring circuitry to support transcoding content into all formats that are supported by user devices takes up valuable space and becomes very expensive.

Embodiments disclosed herein include a system and method for transmitting content in a single format that can be transcoded into a different format for each user device. Transmitting content with a transcoding module and bootstrap code allows content to be viewed by all user devices despite the specific format they each support.

Content may be transmitted via a multicast, along with a transcode module and bootstrap code. After the bootstrap code is received by a user device, it can be used to determine the capabilities of the user device. Once the capabilities of the user device have been determined by the bootstrap code, the results can be sent to the transcode module. The transcode module can then use the format capabilities of the user device and the format of the content being transmitted to determine how the content needs to be transcoded in order for it to be usable by the user device.

In contrast with the systems discussed above with reference to FIGS. 1-3, with a system in accordance with aspects of this disclosure, there is no need to multicast content in multiple formats, which is becomes increasingly expensive with the number of formats that need to be transmitted. Additionally there is no need to hardwire transcoding hardware into the system.

Example systems in accordance with aspects of the present disclosure will now be described with reference to FIGS. 4-7.

Figure 4:
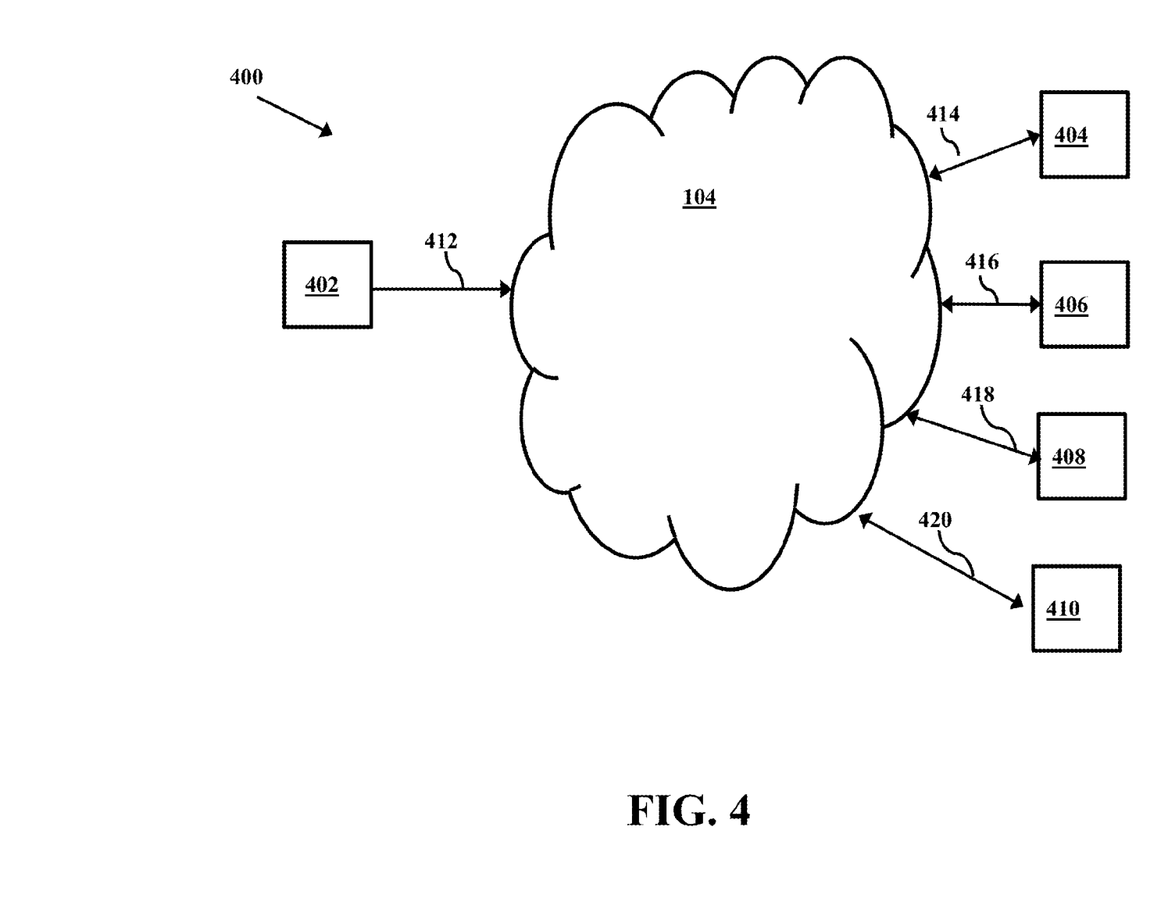
FIG. 4 illustrates another example content delivery system.

FIG. 4 illustrates another example content delivery system 400.

As illustrated in the figure, content delivery system 400 includes some of the same elements of FIG. 1, namely network 104. For purposes of brevity, elements (and their respective functions) that are common between system 100 and system 400 may not be described again.

Content delivery system 400 also includes a content provider 402, a user device 404, a user device 406, a user device 408, and a user device 410. Content provider 402 is operable to multicast content 412 to network 104. User device 404, user device 406, user device 408, and user device 410 are capable of receiving content 412 from network 104.

Figure 5:
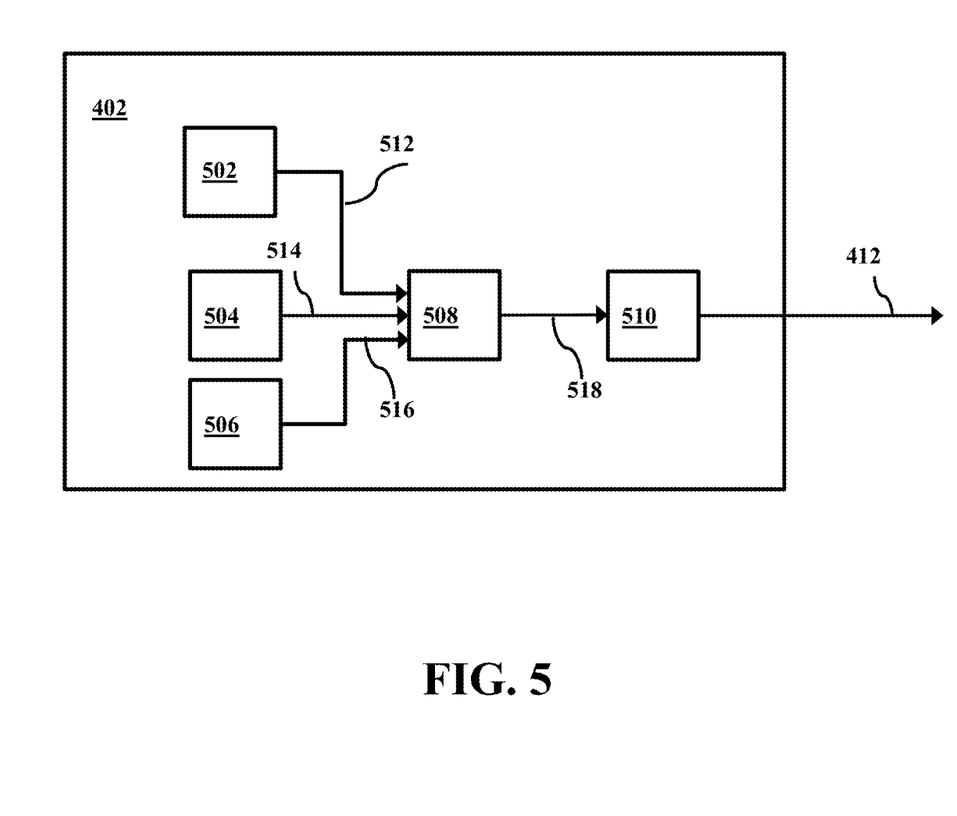
FIG. 5 illustrates an example content provider of FIG. 4.

The operation of content provider 402 will now be further described with additional reference to FIG. 5.

FIG. 5 illustrates an example content provider 402 of FIG. 4.

As illustrated in the figure, content provider 402 further includes a bootstrap code component 502, a transcoder generator component 504, a content module 506, a packetizing module 508, and a transmitter 510.

Bootstrap code component 502 is operable to generate bootstrap code for user device 404, user device 406, user device 408, and user device 410. Transcoder generator component 504 is operable to generate a transcode module that will enable a user device to transcode content from one format to another format. Content module 506 is operable to generate content in a first format. Packetizing module 508 is operable to generate IP multicast packets based on the bootstrap code, the transcode module and the content. Transmitter 510 is operable to transmit the IP multicast packets from packetizing module 508 as content 412 to network 104.

In operation, content module 506 generates content to be transmitted to user devices. In this example, let the content be in a full resolution frame packing 3D format. Content module 506 provides the content to packetizing module 508 via signal 516. Transcoder generator component 504 generates a transcode module that will enable a user device to transcode content from a full resolution frame packing 3D format to any one of full resolution frame packing 3D format (no transcoding), a half resolution—frame compatible 3D format, an MPEG-2 format and an H.264 format. Transcoder generator component 504 provides the transcode module to packetizing module 508 via signal 514. Bootstrap code component 502 generates bootstrap code to initiate operation of a user device. Bootstrap code component 502 provides the bootstrap code to packetizing module 508 via signal 512.

Packetizing module 508 then generates IP packets based on the transcode module, the content and the bootstrap code. In an example embodiment, packetizing module 508 encapsulates the transcode module, the content and the bootstrap code in User Datagram Protocol (UDP/IP) packets with separate multicast addresses. The UDP/IP packets are then encapsulated into Digital Storage Media Command and Control (DSMCC) Addressable sections. The DSMCC Addressable sections are then split into MPEG-2 TS packets and are provided to transmitter 510 as signal 518. Transmitter 510 then transmits the MPEG-2 TS packets as a data packet identifier (PID) within an existing virtual channel multiplexed with audio PIDs and video PIDs. The transmission of data PIDs by transmitter 510 is announced using a Session Announcement Protocol/Session Description Protocol (SAP/SDP). The SAP/SDP packets are sent on a well-known multicast address so user devices may join the multicast session at any time.

Returning to FIG. 4, the transmission bootstrap code component 502, transcode module 504, and content 506 by transmitter 510 corresponds to the transmission of content 412.

In operation, content provider 402 will provide content 412, via an IP multicast, to network 104. Simultaneously, user device 404 will request content 412 from network 104.

After a request for content 412 has been made by user device 404, network 104 will transmit content 412 to user device 404. The operation of user device 404 will now be further described with additional reference to FIG. 6.

In contrast with the examples discussed above with reference to FIGS. 1 and 2, content provider 402 provides the content in a single format. This single format includes instructions for decoding by way of included transcode module 504. In contrast with the example discussed above with reference to FIG. 3, content provider 402 eliminates a need for an independent transcoder, as a result of included transcode module 504.

Figure 6:
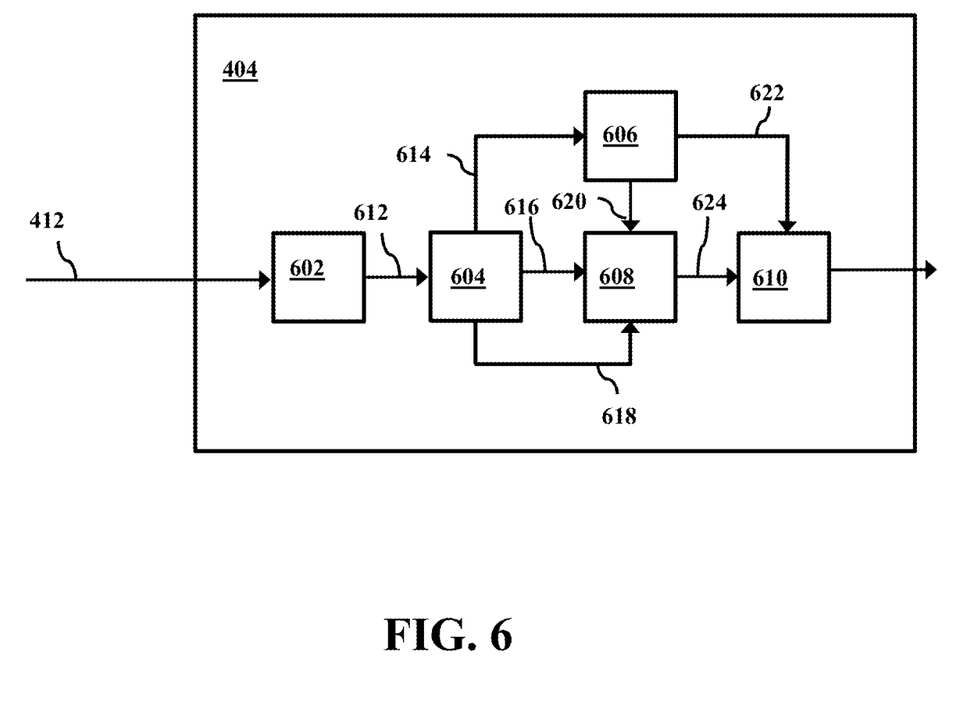
FIG. 6 illustrates an example user device of FIG. 4.

FIG. 6 illustrates an example user device 404 of FIG. 4.

As illustrated in the figure, user device 404 further includes a receiving component 602, a parsing component 604, a booting component 606, a transcoding component 608, and a decoding component 610.

Receiving component 602 is operable to receive an internet protocol multicast packet stream based on a bootstrap code, a transcoder module, and content. Parsing component 604 is operable to parse the internet protocol multicast packets in the bootstrap code, the transcoder module, and the content. Booting component 606 is operable to initiate operation of transcoding component 608 and decoding component 610 based on the bootstrap code. Transcoding component 608 is operable to transcode the content from a first format into transcoded content of a second format via the transcoder module. Decoding component 610 is operable to decode the transcoded content from transcoding component 608.

In operation, receiving component 602 of user device 404 receives content 412 from network 104. Receiving component 602 may be any device that is capable of receiving an IP multicast. Receiving component 602 then sends content 412 to parsing component 604, via signal 612. Parsing component 604 then parses the data PIDs of content 412 into bootstrap code, the transcode module, and content. This will be described in greater detail with reference to FIG. 7.

Figure 7:
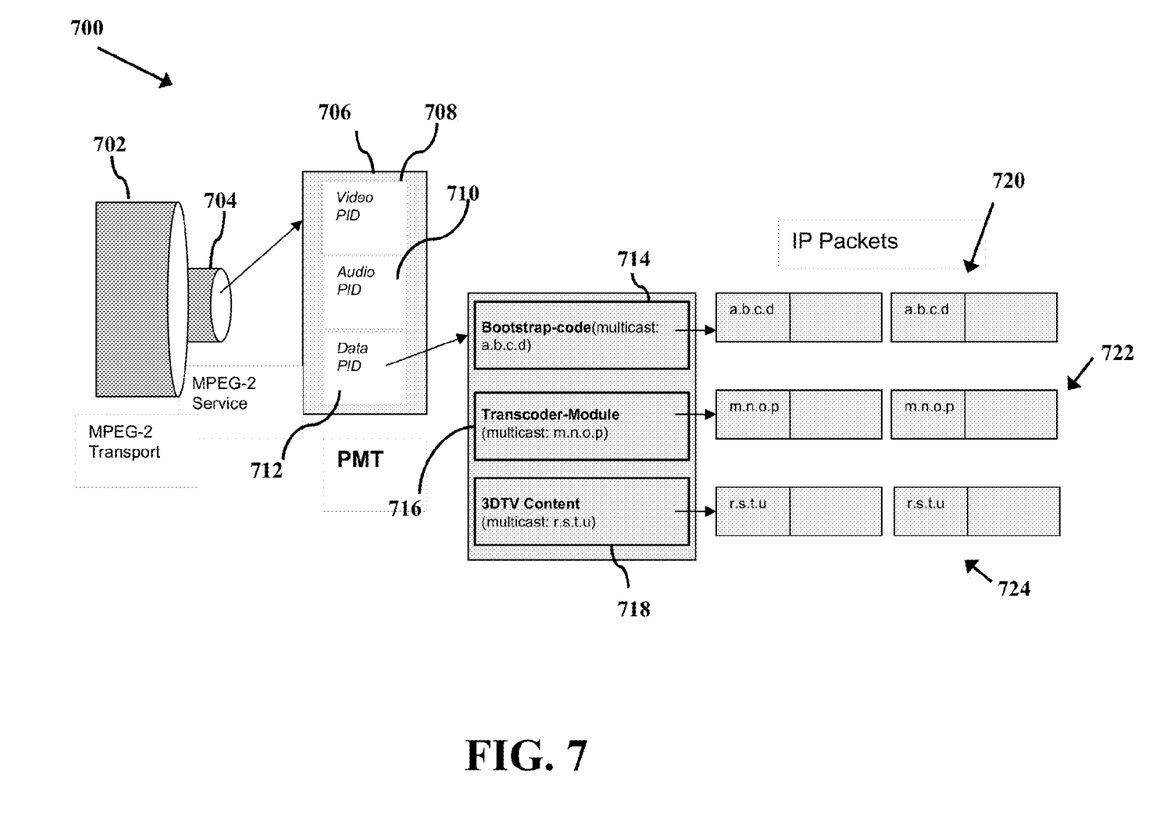
FIG. 7 illustrates the delivery of 3D content, bootstrap code, and transcode module via an IP multicast session within an MPEG-2 transport stream.

FIG. 7 illustrates an example embodiment of delivery of 3D content, bootstrap code, and a transcoder module via an IP multicast session within an MPEG-2 transport stream 700.

As illustrated in the figure, transport stream 700 includes a MPEG-2 transport stream 702, a MPEG-2 service 704, and a program map table (PMT) 706. With reference to FIG. 4, MPEG-2 transport stream 702 corresponds to signal 412. With reference to FIG. 5, MPEG-2 service 704 corresponds to content 412.

Within MPEG-2, a transport stream has a concept of programs. Each single program is described by a Program Map Table (PMT) which has a unique PID, and the elementary streams associated with that program have PIDs listed in the PMT. For instance, a transport stream used in digital television might contain three programs, to represent three television channels. Suppose each channel consists of one video stream, one or two audio streams, and any necessary metadata. A receiver wishing to decode a particular "channel" merely has to decode the payloads of each PID associated with its program. It can discard the contents of all other PIDs. A transport stream with more than one program is referred to as MPTS—Multi Program Transport Stream. A single program transport stream is referred to as SPTS—Single Program Transport Stream.

In this example, PMT 706 further includes a video PID 708, an audio PID 710, and a data PID 712. Data PID 712 further includes bootstrap code 714, a transcoder module 716, and content 718. Here, bootstrap code 714 corresponds to the bootstrap code generated by bootstrap code component 502 of FIG. 5. Similarly, transcoder module 716 corresponds to the transcoder module generated by transcoder generator component 504 of FIG. 5. Similarly, content 718 corresponds to the content generated by content component 506 of FIG. 5.

Video PID 708 identifies the location of video packets in the MPEG-2 payload. Audio PID 710 identifies the location of audio packets in the MPEG-2 payload. Data PID 712 includes bootstrap code component 502, transcoder generator component 504, and content 506. In some embodiments, instead of a single data PID, multiple data PIDs may be provided. For example, one PID may be provided for the SAD/SDP, while another PID may be provided for the transcoder module, while still another PID may be provided for the content. The plural PID embodiment may assist in selecting components more efficiently on the receiver.

Returning to FIG. 6, parsing component 604 parses PMT 706 into video PID 708, audio PID 710, and data PID 712. Parsing component 604 then further parses data PID 712 to obtain bootstrap code 714 as a series of IP packets 720, transcoder module 716 as a series of IP packets 722 and content 718 as a series of IP packets 724.

Returning to FIG. 6, parsing component 604 sends bootstrap code 714 to booting component via signal 614. Parsing component 604 additionally sends transcoder module 716 to transcoding component 608 via signal 616. Parsing component 604 additionally sends content 718 to transcoding component 608 via signal 618.

Bootstrap code 714 initiates a boot function of user device 404. In particular, based on bootstrap code 714, booting component 606 actuates transcoding component 608 via signal 620 and actuates decoding component 610 via signal 622.

As mentioned previously, bootstrap code 714 corresponds to the bootstrap code generated by bootstrap code component 502 of FIG. 5. In this sense, bootstrap code component 502 is able to generate the bootstrap code to enable a boot function of any type of intended user device. If a new user device, other than user devices 404, 406, 408 and 410, are brought online to receive a multicast from content provider 402, then bootstrap code component 502 need only modify the bootstrap code to enable booting of the new user device.

Further, booting component 606 actuates transcoding component 608 by accessing the appropriate portion of the bootstrap code for the particular user device. In other words, by identifying and executing the correct portion of the bootstrap code, booting component 606 will have identified the type of user device of user device 404. Thus booting component 606 will have identified the format for which 404 can decode and render content 718. In this manner, bootstrap code component 502 is able to determine the format for which user device 404 can decode and render content 718.

In some embodiments, the portion of the bootstrap code for transcoding component 608 includes instructions to obtain the transcoder module at a predetermined multicast IP address. This will be described in more detail below.

Returning to FIG. 6, after being booted via signal 620, transcoding component 608 is able to transcode content 718, as received via signal 618, in a manner as instructed by transcoder module 716, as received via signal 616. In some embodiments, transcoder module 716 includes actual coded instructions for transcoding content 718 from its original format to a format for which user device 404 can render. In some embodiments, transcoder module 716 includes a multicast IP address that receiving component 602 may tune to obtain actual coded instructions for transcoding content 718 from its original format to a format for which user device 404 can render.

In some embodiments, transcoder module 716 is not included in PMT 706. Alternatively, as mentioned above, the bootstrap code for transcoding component 608 may include instructions to obtain the transcoder module at a predetermined multicast IP address. As such, in these embodiments, a transcoder module will be obtained after the initial IP multicast of the content.

Once transcoding component 608 has obtained the coded instructions for transcoding content 718 from its original format to a format for which user device 404 can render, transcoding component 608 transcodes content 718. The transcoded content is then provided to decoding component 610 via signal 622.

After being actuated by booting component via signal 622, and after having received the transcoded content via signal 624, decoding component 610 is able to decode the transcoded content. The decoded content may then be rendered on the user device.

In summary, the bootstrap code, the transcoder module, and the content transmitted by a content provider, are bundled and multicast in-band as an IP multicast session. The IP multicast session is announced using SAP/SDP packets. The SAP/SDP packets are sent on a well-known multicast address so user devices may join the multicast session at any time. The bootstrap code, transcoder module, and the content are encapsulated in User Datagram Protocol (UDP/IP) packets with separate multicast addresses. The UDP/IP packets are encapsulated into digital storage media command and control (DSMCC) addressable sections. The DSMCC addressable sections are then split into MPEG-2 TS packets, which are then transmitted as a data service as one or more of data PID within an existing virtual channel.

Next, when user device tunes to a channel containing the IP multicast session, it obtains information about the data service, parses the PMT, and demuxes the video PID, the audio PID, and the data PID. Once video PID, audio PID, and data PID have been demuxed, the user device can obtain the SAP/SDP packets. After the SAP/SDP packets have been obtained, the user device may parse them to obtain either the bootstrap code or multicast addresses to download and executes bootstrap code.

Further, any of user device 408 and user device 410 may additionally receive content 412 from network 104. In each case, a corresponding parsing component will parse PMT 706 and parse PID 712 to obtain bootstrap code 714, transcoder module 716 and content 718. Bootstrap code 714 will actuate each respective transcoding component and decoding component. Transcoder module 716 will enable each respective device to transcode content 718 from its original format to a format for which that respective device can decode and render. Finally, a decoding component in each respective device will be able to decode the transcoded content for rendering.

In the previous example embodiments, transcoding of content 506 was done by downloading bootstrap code component 502, transcode module 504, and content 506 by each of user device 404, user device 406, user device 408, and user device 410. In another example embodiment, an IP address may be sent in the data PID that directs each user device to a location where content that has already been transcoded, may be downloaded from.

It should be noted that in cases where transcoding is performed at a gateway device, as opposed to being performed by the user device where the content will be displayed, the bootstrap code may be used to determine the capabilities of the user device. This may be accomplished by any known handshaking method performed between the gateway device and user device.

Aspects of the present invention provide a system and method for which content may be transmitted, via a multicast, along with a transcode module and bootstrap code. After the bootstrap code is received by a user device, it can be used to determine the format capabilities of the user device. Once the capabilities of the user device have been determined by the bootstrap code, the results can be used by the transcode module to determine how the content needs to be transcoded in order for it to be usable by the user device. In contrast with conventional systems there is no need for to multicast content in multiple formats, which is becomes increasingly expensive with the number of formats that needs to be transmitted. Additionally there is no need to hardwire transcoding hardware into the system.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. An internet protocol multicast provider comprising:
a bootstrap code component operable to generate a bootstrap code configured to determine three-dimensional television (3DTV) capabilities of an internet protocol multicast receiver and initiate transcoding in accordance with the determined 3DTV capabilities at the respective internet protocol multicast receiver;
a transcoder generator component operable to generate a transcoder module for transcoding content in a plurality of formats, the format selected for transcoding at the respective internet protocol multicast receiver determined from the bootstrap code;
a content module operable to generate three-dimensional (3D) content in a first format;
a packetizing module operable to generate internet protocol multicast packets based on the bootstrap code, the transcoder module and the content; and
a transmitter for multicasting the three-dimensional (3D) content from the internet protocol multicast provider to a plurality of internet protocol multicast receivers in a single format being the first format, bundling the 3D content with the bootstrap code and transcoder module,
wherein the transcoder module is operable to instruct at least one of the plurality of internet protocol multicast receivers to play the content in the first format when the at least one of the plurality of internet protocol multicast receivers is determined by the bootstrap code to be capable of decoding and rendering the 3D content in the multicasted format, and
wherein the transcoder module is operable to instruct the at least one of the plurality of internet protocol multicast receivers to transcode the content from the multicasted format to a different one of the plurality of formats when the at least one of the plurality of internet protocol multicast receivers is determined by the bootstrap code to be capable of decoding and rendering the 3D content in the different one of the plurality of formats.

2. The internet protocol multicast provider of claim 1, wherein the bootstrap code is further operable to instruct the internet protocol multicast receiver to obtain the transcoder module at a predetermined multicast transcoder module address.

3. The internet protocol multicast provider of claim 1, wherein the bootstrap code is further operable to instruct the internet protocol multicast receiver to obtain the content at a predetermined multicast content address.

4. The internet protocol multicast provider of claim 1, wherein said content module is operable to generate the content as three-dimensional content.

5. An internet protocol multicast method comprising:
generating, via a bootstrap code component, a bootstrap code configured to determine three-dimensional television (3DTV) capabilities of an internet protocol multicast receiver and initiate transcoding in accordance with the determined 3DTV capabilities at the respective internet protocol multicast receiver;
generating, via transcoder generator component, a transcoder module for transcoding content in a plurality of formats, the format selected for transcoding at the respective internet protocol multicast receiver determined from the bootstrap code;
generating, via a content module, three-dimensional (3D) content in a first format; and
generating, via a packetizing module, internet protocol multicast packets based on the bootstrap code, the transcoder module and the content,
multicasting the three-dimensional (3D) content in a single format being the first format to a plurality of internet protocol multicast receivers, bundling the 3D content with the bootstrap code and transcoder module,
wherein the transcoder module is operable to instruct at least one of the plurality of internet protocol multicast receivers to play the content in the first format when the at least one of the plurality of internet protocol multicast receivers is determined by the bootstrap code to be capable of decoding and rendering the 3D content in the multicasted format, and
wherein the transcoder module is operable to instruct the at least one of the plurality of internet protocol multicast receivers to transcode the content from the multicasted format to a different one of the plurality of formats when the at least one of the plurality of internet protocol multicast receivers is determined by the bootstrap code to be capable of decoding and rendering the 3D content in the different one of the plurality of formats.

6. The internet protocol multicast method of claim 5, wherein the bootstrap code is further operable to instruct the internet protocol multicast receiver to obtain the transcoder module at a predetermined multicast transcoder module address.

7. The internet protocol multicast method of claim 5, wherein the bootstrap code is further operable to instruct the internet protocol multicast receiver to obtain the content at a predetermined multicast content address.

8. The internet protocol multicast method of claim 5, wherein said generating, via a content module, content in a first format comprises generating the content as three-dimensional content.

9. An internet protocol multicast receiver comprising:

a receiving component operable to receive a multicasted internet protocol multicast packet stream for three-dimensional (3D) content and a bootstrap code and a transcoder module bundled with 3D content;

a parsing component operable to parse the internet protocol multicast packets into the bootstrap code, the transcoder module, and the content;

a booting component operable to initiate operation based on the bootstrap code that determines three-dimensional television (3DTV) capabilities of the internet protocol multicast receiver and initiates transcoding in accordance with the determined 3DTV capabilities;

a transcoding components operable to transcode the content in a format selected for transcoding determined from the bootstrap code;

wherein the transcoder module is operable to instruct the internet protocol multicast receiver to play the content in a multicasted format when the internet protocol multicast receiver is determined by the bootstrap code to be capable of decoding and rendering the 3D content in the multicasted format, and wherein the transcoder module is operable to instruct the internet protocol multicast receiver to transcode the content from the multicasted format to a different one of a plurality of formats when the internet protocol multicast receiver is determined by the bootstrap code to be capable of decoding and rendering the 3D content in the different one of the plurality of formats; and a decoding component operable to decode the transcoded content.

* * * * *